United States Patent [19]

Eusemann et al.

[11] 4,287,970
[45] Sep. 8, 1981

[54] HYDRO-PNEUMATIC DAMPING DEVICE

[75] Inventors: Robert Eusemann, Bergrheinfeld; Günther Handke, Euerbach; Manfred Koller, Bergrheinfeld, all of Fed. Rep. of Germany

[73] Assignee: Fichtel & Sachs AG, Schweinfurt, Fed. Rep. of Germany

[21] Appl. No.: 115,500

[22] Filed: Jan. 25, 1980

[30] Foreign Application Priority Data

Feb. 16, 1979 [DE] Fed. Rep. of Germany ....... 2905928

[51] Int. Cl.$^3$ .............................................. F16F 9/06
[52] U.S. Cl. ..................................... 188/269; 188/315
[58] Field of Search ...................... 188/269, 315, 322; 267/64 R, 8 R, 126

[56] References Cited

U.S. PATENT DOCUMENTS

| | | | |
|---|---|---|---|
| 3,365,191 | 1/1968 | Ellis et al. | 188/269 |
| 3,519,109 | 7/1970 | Whisler | 188/269 |
| 3,520,384 | 7/1970 | Nicholls | 188/269 |
| 3,661,236 | 5/1972 | Wossner | 188/315 |
| 3,804,216 | 4/1974 | Katsumori et al. | 267/64 R |
| 4,132,395 | 1/1979 | Fox | 188/269 |
| 4,189,033 | 2/1980 | Katsumori | 188/315 |

FOREIGN PATENT DOCUMENTS

| | | |
|---|---|---|
| 1146705 | 10/1963 | Fed. Rep. of Germany . |
| 2111713 | 9/1972 | Fed. Rep. of Germany . |
| 2715826 | 10/1977 | Fed. Rep. of Germany . |

Primary Examiner—Hiram Bernstein
Attorney, Agent, or Firm—Toren, McGeady and Stanger

[57] ABSTRACT

A hydro-pneumatic damping device particularly for spring legs of automotive vehicles comprises an inner cylinder, an outer container, a central cavity within the inner cylinder, an annular cavity between the inner cylinder and the outer container, a piston rod with a piston unit, venting passage means between the central cavity and the annular cavity extending across a cylinder closing unit and check valve means associated to said venting passage means. The check valve means comprise an annular check valve member in frictional sliding engagement with the piston rod for axial movement with the piston rod toward a sealing position during inward movement of the piston rod and toward an opening position during outward movement of the piston rod, first and second abutment means being provided for defining said sealing position and said opening position of said annular check valve member respectively.

15 Claims, 6 Drawing Figures

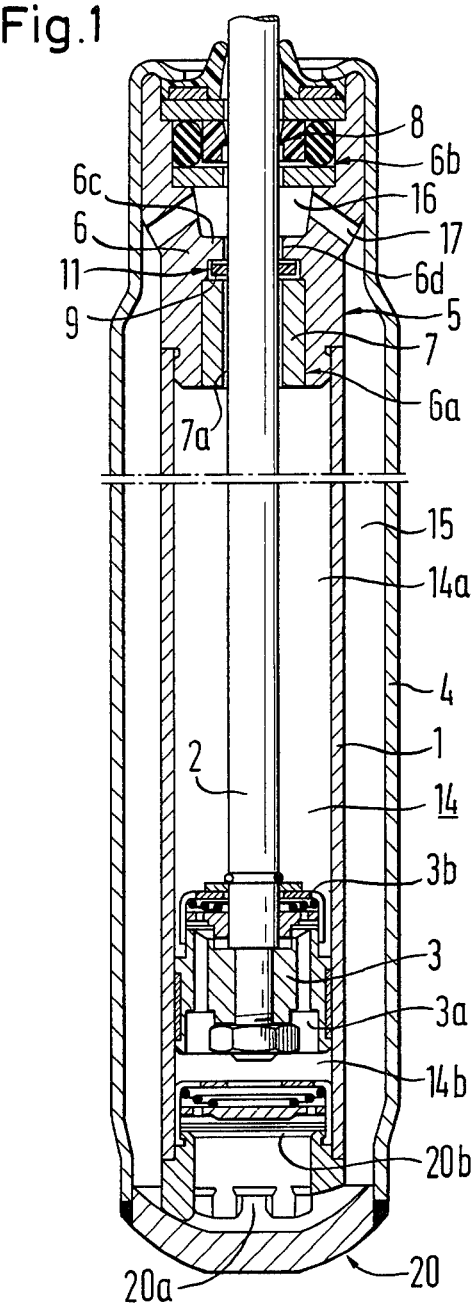

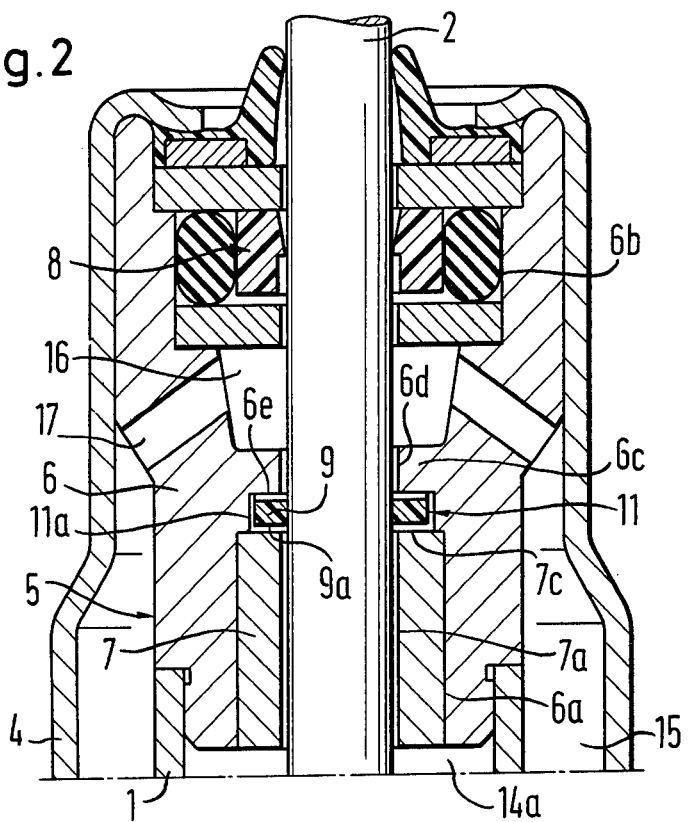
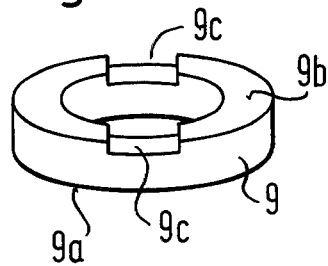
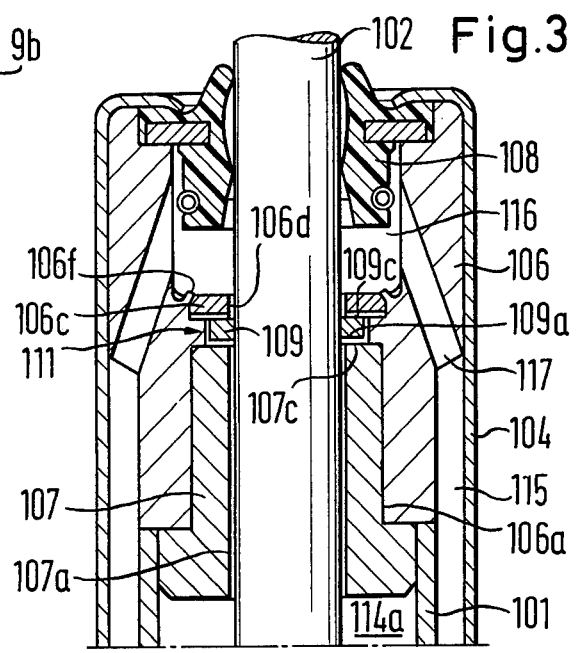

HYDRO-PNEUMATIC DAMPING DEVICE

BACKGROUND OF THE INVENTION

The present invention relates generally to a hydro-pneumatic damping device and more particularly to a hydro-pneumatic damping device, which is particularly adapted for use with a spring leg of a vehicle. The invention is particularly concerned with the type of hydro-pneumatic damping devices comprising:

- an inner cylinder having an axis and two ends,
- a central cavity defined within said inner cylinder between said two ends,
- an outer container surrounding said inner cylinder, said outer container having two ends adjacent respective ends of said inner cylinder,
- an annular cavity defined between said inner cylinder and said outer container,
- first and second closure means closing said two ends of said cylinder and said container,
- piston rod passage means through the first ones of said closure means,
- fluid passage means between said central cavity and said annular cavity adjacent the second ones of said closure means,
- first fluid throttleing means associated to said fluid passage means,
- a piston rod axially extending through said piston rod passage means and into said central cavity,
- a piston unit mounted on said piston rod within said central cavity and defining two working chambers within said cavity, a first working chamber adjacent said first closure means and a second working chamber adjacent said second closure means,
- fluid connecting means connecting said two working chambers across said piston unit,
- second fluid throttleing means associated to said fluid connecting means,
- a body of liquid at least within the central one of said cavities,
- a body of gas within said annular cavity.

Such a hydro-pneumatic damping device is known from German Pat. No. 11 46 705.

With such hydro-pneumatic damping device it is important, that the first working chamber which is regularly the upper working chamber, is always filled with liquid. The presence of gas in this first working chamber is objectionable because the function of the device is altered by such presence of gas. It could happen due to the presence of gas in the first working chamber, that this gas is compressed, when the piston rod moves outward from the central cavity and that no damping effect is achieved. Therefore it is of high importance, that a gas which has been collected in the upper or first working chamber is brought into the annular cavity.

From the above mentioned German Pat. No. 11 46 705 it is known, that the first closure means comprise a cylinder closing unit surrounding said piston rod and having an inner end adjacent said first working chamber and an outer end,

- a sealing unit engaging said piston rod and having an inner end adjacent said outer end of said cylinder closing unit and
- venting passage means between said first working chamber and said annular cavity extending across said cylinder closing unit and inside said inner end of said sealing unit.

With the known device it is still possible, that during the inward movement of the piston rod, when the pressure within the first working chamber is decreased and the pressure within the annular cavity is increased air is pumped from the annular cavity into the first working chamber, so that the function of the hydro-pneumatic damping device is affected.

A further disadvantage of the known device is, that it can be mounted only in such a position, that the piston rod is substantially vertically directed upwards. At a small inclination already the function of the known hydo-pneumatic device is affected.

The present invention is directed towards avoiding the disadvantages of the known construction and toward the provision of a hydro-pneumatic damping device in which substantially no air can enter from the annular cavity into the first working chamber, even when the device of this invention is mounted in an inclined position.

SUMMARY OF THE INVENTION

The present invention may be described as a hydro-pneumatic double tube shock absorber consisting of a cylinder which is filled with a body of liquid, a piston being provided within said cylinder, said piston being provided with damping valves, said piston dividing the cavity within said cylinder into a first working chamber and a second working chamber, said piston being connected to a piston rod extending through closure means at one end of the cylinder, a container surrounding said cylinder and defining a pressure balancing cavity, venting passage means being provided between said first working chamber and said annular pressure balancing cavity, said venting passage means extending across a cylinder closing unit at one end of the cylinder and inside a sealing unit engaging said piston rod.

According to the present invention check valve means are associated to said venting passage means permitting fluid to flow from said first working chamber towards said annular cavity and preventing reverse flow, said check valve means comprising an annular check valve member in frictional sliding engagement with said piston rod for axial movement with said piston rod toward a sealing position during inward movement of said piston rod and toward an opening position during outward movement of said piston rod, first and second abutment means being provided for defining said sealing position and said opening position of said annular check valve member respectively.

In one aspect of the invention said annular check valve member is provided with a first sealing face directed toward said first working chamber, a second sealing face being provided by said cylinder closing means, said second sealing face being directed towards said sealing unit, said first and second sealing faces being in sealing engagement, when said annular check valve member is in said sealing position.

The venting passage means may comprise a venting passage section which is defined by an annular gap between the piston rod and the cylinder closing means, said annular check valve member being in sealing engagement with said piston rod, so as to close said annular gap, when being in said sealing position.

The various features of novelty, which characterise the invention are pointed out with particularity in the claims annexed to and forming a part of this disclosure.

For a better understanding of the invention, its operating advantages and specific objects attained by its use reference should be had to the accompanying drawings and drescriptive matter, in which there are illustrated and described preferred embodiments of the invention.

DESCRIPTION OF THE DRAWINGS

In the drawings

FIG. 1 is a longitudinal section of a hydro-pneumatic damping device of this invention to be used in connection with a spring leg for an automotive vehicle;

FIG. 2 shows the piston rod passage means and the venting passage means of the device according to FIG. 1;

FIG. 2a shows an enlarged view of an annular check valve member of the embodiment according to FIGS. 1 and 2;

FIG. 3 shows the piston rod passage means of a second embodiment;

In FIG. 1 there is shown a hydro-pneumatic damping device of this invention to be used in a spring leg of an automotive vehicle.

Figure 4:
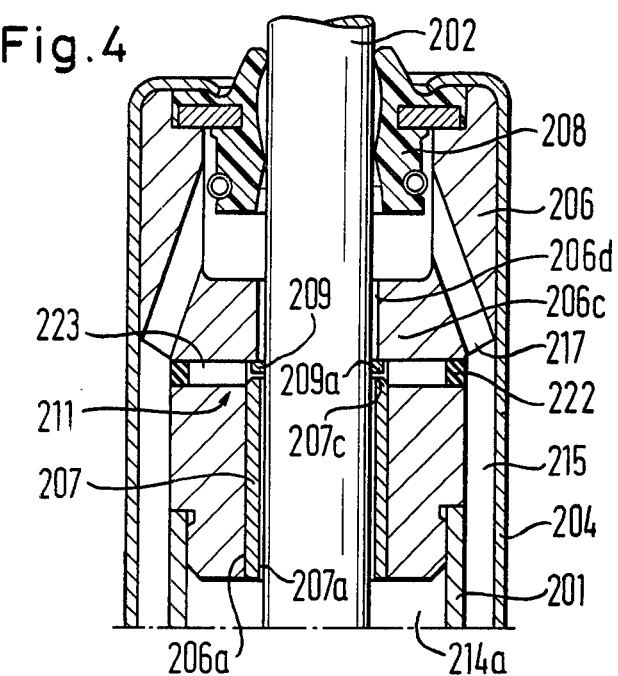
FIG. 4 shows the piston rod passage means of a third embodiment.

The device of FIG. 1 comprises a cylinder 1 in which a central cavity 14 is defined. The cylinder 1 is surrounded by an outer container 4. An annular cavity 15 is defined between the cylinder 1 and the container 4. At the upper end of the cylinder 1 and the cavity 4 there are provided closure means 5. At the lower end of the cylinder 1 and the container 4 there are provided second closure means 20. The first closure means 5 define a piston rod passage by which a piston rod 2 is introduced into the central cavity 14. On the piston rod 2 there is mounted within the central cavity 14 a piston unit 3, which divides the central cavity 14 into a first working chamber 14a and a second working chamber 14b. The piston unit 3 is provided with fluid connecting means 3a connecting the first working chamber 14a and the second working chamber 14b across the piston unit 3. This fluid connecting means 3a are provided with a damping valve 3b, which throttels the passage of fluid through the fluid connecting means 3a, when the piston unit 3 is axially moved with respect to cylinder 1. The second closure means 20 are provided with fluid passage means 20a connecting the annular cavity 15 and the second working chamber 14b. These fluid connecting means 20a are provided with a damping valve 20b.

The first closure means 5 comprise a closure member 6. The closure member 6 closes both the upper end of the cylinder 1 and the upper end of the outer container 4. In the closure member 6 there is defined an inner receiving chamber 6a which receives a guiding sleeve 7 for the piston rod 2. Further there is defined within closure member 6 an outer receiving chamber 6b which receives a sealing unit 8.

Between the guiding sleeve 7 and the sealing unit 8, there is provided a collecting chamber 16, which collecting chamber 16 is interconnected by bores 17 with the annular cavity 15. The guiding sleeve 7 defines an annular gap 7a together with the piston rod 2. A further annular gap 6d is defined between an annular rib 6c and the piston rod 2. The annular gap 7a, the annular gap 6d, the collecting chamber 16 and the inclined bores 17 define venting passage means between the first working chamber 14a and the annular cavity 15. In these venting passage means there is provided a check valve 11, which allows passage of fluid from the first working chamber 14a to the collecting chamber 16 and prevents passage of fluid from the collecting chamber 16 to the first working chamber 14a.

The check valve 11 is shown in more detail in FIG. 2. The check valve 11 comprise as shown in FIG. 2 an annular check valve member 9. This annular check valve member 9 is housed within an valve chamber 11a. The valve chamber 11a is defined by the upper terminal face 7c of the guiding sleeve 7, and by the annular rib 6c. The axial height of this check valve member 11a is larger than the axial thickness of the annular check valve member 9. The axial check valve member 9 is made of elastomeric material such as natural or synthetic rubber. The annular check valve member is in frictional and sealing engagement with the piston rod 2.

A first sealing face 9a is provided at the lower side of the annular check valve member 9. This first sealing face 9a co-operates with the terminal face 7c of the sealing sleeve 7, said face 7c acting as a second sealing face.

The annular check valve member 9 is shown in more detail in FIG. 2a. A first abutment face 9b is provided on the upper side of the annular check valve member 9. This first abutment face 9b co-operates with a second abutment face 6e defined at the lower side of the annular rib 6c. In the first abutment face 9b of the annular check valve 9 there are provided radial grooves 9c.

The central cavity 14 is filled with a liquid. The annular cavity 15 is partially filled with liquid and partially filled with gas. The gas may be air. The pressure of the air in the annular cavity 15 may by atmospheric pressure, when the piston rod 2 is in its uppermost position. It is however also possible, that the pressure in the annular cavity 15 is superatmospheric, even when the piston rod 2 is in its uppermost position with respect to the cylinder 1.

In operation, when the piston rod 2 is drawn upwards from the position as shown in FIG. 1 the liquid contained in the first working chamber 14a is driven through the fluid connecting means 3a into the second working chamber 14b. As the fluid connecting means 3a are throttelled by the throttling valve means 3b the pressure in the first working chamber 14a is increased, when the piston rod 2 and the piston unit 3 moves upwards as shown in FIG. 1. By the upward movement of the piston rod 2 the annular check valve member 9 is also moved upward due to the frictional and sealing engagement with the piston rod 2. The upward movement is however limited by the engagement of the first abutment face 9b of the annular check valve member 9 with the second abutment face 6e of the annular rib 6c. When the first abutment face 9b has come into abutting engagement with the second abutment face 6e the annular check valve member 9 is stopped and slides over the piston rod 2 when the piston rod 2 is further moved upwards.

During the upward movement of the piston rod 2 fluid can escape from the working chamber 14a through the annular gap 7a, the check valve 11, the annular gap 6d, the collecting chamber 16 and the bores 17 into the annular cavity 15. It is to be noted that the external diameter of the check valve member 9 is smaller than the internal diameter of the check valve chamber 11a. So gas bubbles included in the first working chamber 14a can escape from the working chamber into the collecting chamber 16 and the annular cavity 15. Also some liquid may escape through the annular gap 7a, when the piston rod 2 moves upward. Primarily, however the gas, which is included in the working chamber 14a escapes through the annular gap 7a particularly when the device is kept in a vertical position as shown in FIGS. 1 and 2.

When the piston rod 2 moves downward again, the annular check valve member 9 is moved downward with the piston rod 2 due to its frictional engagement with the piston rod 2. The downward movement of the annular check valve member 9 is stopped as soon as the first sealing face 9a of the annular check valve member 9 abuts against the second sealing face 7c, i.e. the upper terminal face of the annular sealing sleeve 7.

As soon as the first sealing face 9a is in contact with the second sealing face 7c the check valve 11 is closed, so that no fluid can flow from the collecting chamber 16 through the gap 7a into the first working chamber 14a. This is important, because during downward movement of the piston rod 2 the pressure in the second working chamber 14b is increased and therefore also the pressure in the annular cavity 15. The increased pressure in the annular cavity 15 increases the tendency of gas to flow through the bores 17 into the collecting chamber 16 and from the collecting chamber 16 through the annular gaps 6d and 7a into the first working chamber 14a. This entrance of gas into the working chamber 14 which is highly undesirable is prevented by the check valve 11, as soon as the first sealing face 9a is in sealing engagement with the second sealing face 7c.

It should be noted, that the check valve 11 closes during downward movement of the piston rod 2 independently of the pressure difference between the annular cavity 15 and the first working chamber 14a and that the check valve 11 opens during upward movement of the piston rod 2 independently of the pressure difference between the first working chamber 14a and the annular cavity 15. This is highly desirable. The check valve 11 can be understood as a check valve which opens and closes in dependency of the direction of movement of the piston rod 2.

FIG. 3 shows a modified embodiment which is similar to the embodiment of FIGS. 1 and 2. Analogous parts are designated by the same reference numbers as in FIGS. 1 and 2 increased by 100. In the embodiment of FIG. 3 the sealing unit 108 is modified as compared with the embodiment of FIGS. 1 and 2. Further the check valve 111 is modified: the annular rib 106c is a part separate from closure member 106 and is mounted by deflecting a radial lip 106f. Further the radial grooves 9c, which are provided in the annular check valve member 9 in the embodiment of FIGS. 1 and 2 are provided at the lower side of the annular abutment rib 106c in the embodiment of FIG. 3 and designated by 109c.

The operation of the embodiment of FIG. 3 is identical with the operation of the embodiment of FIGS. 1 and 2.

FIG. 4 shows a further similar embodiment, analogous parts being designated with the same reference numerals increased by 200. In this further embodiment the annular check valve member 209 is again provided with a first sealing face 209a and this first sealing face 209a co-operates with the second sealing face 207c at the upper terminal end of the guiding sleeve 207. The annular check valve member 209 is in sealing and frictional engagement with the piston rod 202. When the piston rod 202 moves downward, the check valve 211 is closed. When the piston rod 202 moves upwards the check valve member 209 abuts with its upper face against the annular rib 206c. In this latter position the annular gap 207a is in communication with the annular cavity 215 through channels 223, which channels 223 comprise filter members 222. The filter members 222 are preferably made of a sintered material like sintered plastic material.

Figure 5:
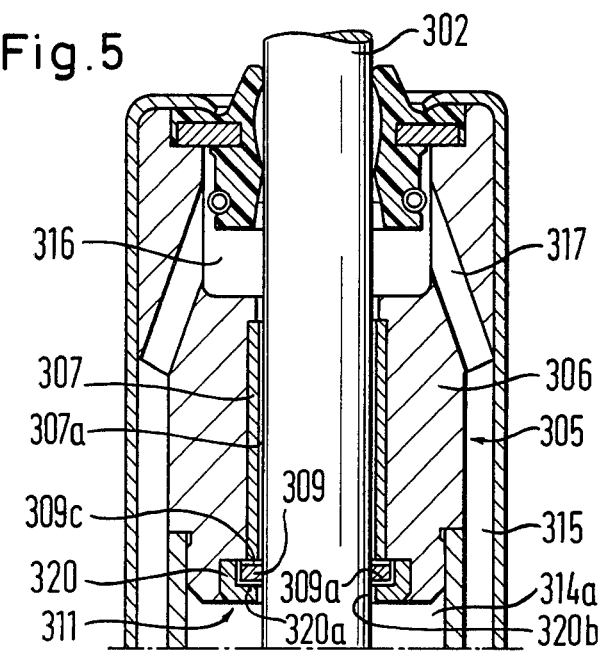
FIG. 5 shows the piston rod passage means of a fourth embodiment.

In the embodiment of FIG. 5 analogous parts are designated with the same reference numbers as in the precedent figures increased by 300.

In the embodiment of FIG. 5 the check valve 311 is provided at the lower end of the guiding sleeve 307. The check valve 311 comprises an annular check valve member 309. This annular check valve member 309 is housed within an L-shaped cage 320. A first sealing face 309a is provided at the lower terminal end of the annular check valve member 309, whereas a second sealing face 320a is defined on the cage member 320. The cage member 320 defines a gap 320b with the piston rod 302. The cage member 320 is mounted in the closure member 306. When the piston rod 302 moves downward, the annular check valve member 309 engages the second sealing face 320a provided on the cage member 320, so that the gap 320b is closed. When the piston rod 302 is moved upward the sealing faces 309a and 320a are lifted from each other and the annular check valve member 309 abuts against the lower end of the guiding sleeve 307. Radial grooves 309c may be provided in the upper face of the annular check valve member 309 and/or in the lower end of the annular sleeve 307. The venting passage is defined during upward movement of the piston rod by the annular gap 320b and the annular gap 307a, these annular gaps being interconnected by a path of fluid around the annular check valve member 309. So the embodiment of FIG. 5 behaves identic as the predescribed embodiments.

In FIG. 3 there is shown, that the guiding sleeve 107 may extend below the lower end of the closure member 106, so that the guiding sleeve 107 may engage the inner cylindrical face of the cylinder 101.

The embodiment of FIG. 5 is particularly useful when the guiding sleeve 307 is made of relatively soft material. The cage 320 can be molded by injection molding within the closure member 306. It is, however, possible also as shown in FIG. 5 to fix the cage member 320 by deflecting the material of the closure member 306 which surrounds the cage member.

The annular check valve member can also be made of plastic material. It is also possible to use a metallic check valve member. In this case the check valve member may be shaped like a piston ring, i.e. with a radial slot. The check valve member acts also an an oil stripping ring.

In FIG. 3 the annular abutment member 106c may also be radially slotted, i.e. may be an open ring member, in which case the radial slot 109c can be avoided.

What is claimed is:

1. A hydro-pneumatic damping device comprising
   (a) an inner cylinder having an axis and two ends,
   (b) a central cavity defined within said inner cylinder between said two ends,
   (c) an outer container surrounding said inner cylinder, said outer container having two ends adjacent respective ends of said inner cylinder,
   (d) an annular cavity defined between said inner cylinder and said outer container, (e) first and second closure means closing said two ends of said cylinder and said container,
(f) piston rod passage means through the first ones of said closure means,
(g) fluid passage means between said central cavity and said annular cavity adjacent the second ones of said closure means,
(h) first fluid throttling means associated to said fluid passage means,
(i) a piston rod axially extending through said piston rod passage means and into said central cavity,
(k) a piston unit mounted on said piston rod within said central cavity and defining two working chambers within said cavity, a first working chamber adjacent said first closure means and a second working chamber adjacent said second closure means,
(l) fluid connecting means connecting said two working chambers across said piston unit,
(m) second fluid throtteling means associated to said fluid connecting means,
(n) a body of liquid at least within the central one of said cavities,
(o) a body of gas within said annular cavity,
said first closure means comprising
(aa) a cylinder closing unit surrounding said piston rod and having an inner end adjacent said first working chamber and an outer end,
(bb) a sealing unit engaging said piston rod and having an inner end adjacent said outer end of said cylinder closing unit,
(cc) venting passage means between said first working chamber and said annular cavity extending across said cylinder closing unit and axially inside said inner end of said sealing unit,
(dd) check valve means associated to said venting passage means permitting fluid to flow from said first working chamber toward said annular cavity and preventing reverse flow, said check valve means comprising
an annular check valve member in frictional sliding engagement with said piston rod for axial movement with said piston rod toward a sealing position during inward movement of said piston rod and toward an opening position during outward movement of said piston rod, first and second abutment means being provided for defining said sealing position and said opening position of said annular check valve member respectively.

2. A device as set forth in claim 1, wherein said annular check valve member is provided with a first sealing face directed toward said first working chamber, a second sealing face being provided by said cylinder closing unit, said second sealing face being directed toward said sealing unit, said first and second sealing faces being in sealing engagement, when said annular check valve member is in said sealing position.

3. A device as set forth in claim 2, wherein said venting passage means comprises a venting passage section, which is defined by an annular gap between said piston rod and said cylinder closing unit, said annular check valve member being in sealing engagement with said piston rod, so as to close said annular gap when being in said sealing position.

4. A device as set forth in claim 3, wherein said second sealing face is provided by a terminal face of a piston rod guiding sleeve provided by said cylinder closing unit and defining said annular gap.

5. A device as set forth in claim 3, wherein said second sealing face is provided by an annular cage member provided at the inner end of the cylinder closing unit.

6. A device as set forth in claim 1, wherein said annular check valve member is provided with a first abutment face directed toward said sealing unit, said first abutment face engaging when being in said opening position a second abutment face provided by said second abutment means, at least one recess being provided in one of said first and second abutment faces, which recess permits flow of fluid through said venting passage means, when said check valve member is in said opening position.

7. A device as set forth in claim 6, wherein said recess is a radial groove within said one of said abutment faces.

8. A device as set forth in claim 1, wherein said first closure means comprise an annular closure member engaging said inner cylinder and said outer container, an inner receiving chamber being defined in said closure member for receiving a piston rod guiding sleeve and an axially outer receiving chamber being defined in said closure member for receiving said sealing unit.

9. A device as set forth in claim 8, wherein said closure member is provided with an annular rib directed radially inwardly towards said piston rod, said rib defining said second abutment means.

10. A device as set forth in claim 9, wherein said rib is integral with said closure member.

11. A device as set forth in claim 9, wherein said rib is defined by an annular abutment member mounted within said closure member.

12. A device as set forth in claim 9, wherein said annular rib is provided axially between said inner receiving chamber and said outer receiving chamber.

13. A device as set forth in claim 1, wherein said venting passage means comprise a filter member.

14. A device as set forth in claim 13, wherein said filter member comprises a body of sintered material.

15. A device as set forth in claim 8, wherein the piston rod guiding sleeve received in said inner receiving chamber extends axially beyond the inner end of said closure member and is in engagement with an inner face of said inner cylinder.

* * * * *